United States Patent
Retnamma et al.

(10) Patent No.: US 8,417,908 B2
(45) Date of Patent: *Apr. 9, 2013

(54) SYSTEMS AND METHODS FOR COMBINING DATA STREAMS IN A STORAGE OPERATION

(75) Inventors: Manoj Vijayan Retnamma, Ocean, NJ (US); Arun Amarendran, Bangalore (IN); Rajiv Kottomtharayil, Ocean, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/410,770

(22) Filed: Mar. 2, 2012

(65) Prior Publication Data

US 2012/0166745 A1 Jun. 28, 2012

Related U.S. Application Data

(63) Continuation of application No. 12/969,389, filed on Dec. 15, 2010, now Pat. No. 8,131,964, which is a continuation of application No. 11/954,176, filed on Dec. 11, 2007, now Pat. No. 7,861,050, which is a continuation of application No. 10/990,357, filed on Nov. 15, 2004, now Pat. No. 7,315, 923.

(60) Provisional application No. 60/519,526, filed on Nov. 13, 2003.

(51) Int. Cl.
*G06F 12/16* (2006.01)
(52) U.S. Cl.
USPC ........... 711/162; 711/161; 711/165; 707/609; 707/639; 707/640; 707/641; 707/642; 707/647; 709/231
(58) Field of Classification Search .......... 711/161–162, 711/165, E12.103; 707/609, 639–642, 647; 709/231
See application file for complete search history.

(56) References Cited

U.S. PATENT DOCUMENTS

| 4,296,465 A | 10/1981 | Lemak |
| 4,686,620 A | 8/1987 | Ng |

(Continued)

FOREIGN PATENT DOCUMENTS

| EP | 0259912 | 3/1988 |
| EP | 0405926 | 1/1991 |

(Continued)

OTHER PUBLICATIONS

U.S. Appl. No. 10/803,542, filed Mar. 18, 2004, Ignatius, Paul et al.

(Continued)

*Primary Examiner* — Jasmine Song
(74) *Attorney, Agent, or Firm* — Knobbe, Martens, Olson & Bear, LLP

(57) ABSTRACT

Described herein are systems and methods for multiplexing pipelined data for backup operations. Various data streams are combined such as by multiplexing by a multiplexing module. The multiplexing module combines the data from the various data streams received by receiver module(s) into a single stream of chunks. The multiplexing module may combine data from multiple archive files into a single chunk. Additional modules perform other operations on the chunks of data to be transported such as encryption, compression, etc. The data chunks are transmitted via a transport channel to a receive pipeline that includes a second receiver module and other modules. The data chunks are then stored in a backup medium. The chunks are later retrieved and separated such as by demultiplexing for restoring to a client or for further storage as auxiliary copies of the separated data streams or archive files.

14 Claims, 4 Drawing Sheets

U.S. PATENT DOCUMENTS

| | | |
|---|---|---|
| 4,695,943 A | 9/1987 | Keeley et al. |
| 4,888,689 A | 12/1989 | Taylor et al. |
| 4,995,035 A | 2/1991 | Cole et al. |
| 5,005,122 A | 4/1991 | Griffin et al. |
| 5,062,104 A | 10/1991 | Lubarsky et al. |
| 5,093,912 A | 3/1992 | Dong et al. |
| 5,133,065 A | 7/1992 | Cheffetz et al. |
| 5,163,131 A | 11/1992 | Row et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,247,616 A | 9/1993 | Berggren et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,321,816 A | 6/1994 | Rogan et al. |
| 5,333,315 A | 7/1994 | Saether et al. |
| 5,347,653 A | 9/1994 | Flynn et al. |
| 5,377,341 A | 12/1994 | Kaneko et al. |
| 5,388,243 A | 2/1995 | Glider et al. |
| 5,410,700 A | 4/1995 | Fecteau et al. |
| 5,428,783 A | 6/1995 | Lake |
| 5,448,724 A | 9/1995 | Hayashi et al. |
| 5,465,359 A | 11/1995 | Allen et al. |
| 5,487,160 A | 1/1996 | Bemis |
| 5,491,810 A | 2/1996 | Allen |
| 5,495,607 A | 2/1996 | Pisello et al. |
| 5,504,873 A | 4/1996 | Martin et al. |
| 5,515,502 A | 5/1996 | Wood |
| 5,544,345 A | 8/1996 | Carpenter et al. |
| 5,544,347 A | 8/1996 | Yanai et al. |
| 5,555,404 A | 9/1996 | Torbjornsen et al. |
| 5,559,957 A | 9/1996 | Balk |
| 5,559,991 A | 9/1996 | Kanfi |
| 5,588,117 A | 12/1996 | Karp et al. |
| 5,592,618 A | 1/1997 | Micka et al. |
| 5,598,546 A | 1/1997 | Blomgren |
| 5,606,359 A | 2/1997 | Youden et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,644,779 A | 7/1997 | Song |
| 5,651,002 A | 7/1997 | Van Seters et al. |
| 5,673,381 A | 9/1997 | Huai et al. |
| 5,675,511 A | 10/1997 | Prasad et al. |
| 5,680,550 A | 10/1997 | Kuszmaul et al. |
| 5,682,513 A | 10/1997 | Candelaria et al. |
| 5,687,343 A | 11/1997 | Fecteau et al. |
| 5,692,152 A | 11/1997 | Cohen et al. |
| 5,699,361 A | 12/1997 | Ding et al. |
| 5,719,786 A | 2/1998 | Nelson et al. |
| 5,729,743 A | 3/1998 | Squibb |
| 5,737,747 A | 4/1998 | Vishlitsky et al. |
| 5,751,997 A | 5/1998 | Kullick et al. |
| 5,758,359 A | 5/1998 | Saxon |
| 5,761,104 A | 6/1998 | Lloyd et al. |
| 5,761,677 A | 6/1998 | Senator et al. |
| 5,761,734 A | 6/1998 | Pfeffer et al. |
| 5,764,972 A | 6/1998 | Crouse et al. |
| 5,771,391 A | 6/1998 | Lloyd et al. |
| 5,778,395 A | 7/1998 | Whiting et al. |
| 5,790,828 A | 8/1998 | Jost |
| 5,805,920 A | 9/1998 | Sprenkle et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,815,462 A | 9/1998 | Konishi et al. |
| 5,829,023 A | 10/1998 | Bishop |
| 5,829,046 A | 10/1998 | Tzelnic et al. |
| 5,860,104 A | 1/1999 | Witt et al. |
| 5,875,478 A | 2/1999 | Blumenau |
| 5,875,481 A | 2/1999 | Ashton et al. |
| 5,878,056 A | 3/1999 | Black et al. |
| 5,887,134 A | 3/1999 | Ebrahim |
| 5,890,159 A | 3/1999 | Sealby et al. |
| 5,897,643 A | 4/1999 | Matsumoto |
| 5,901,327 A | 5/1999 | Ofek |
| 5,924,102 A | 7/1999 | Perks |
| 5,926,836 A | 7/1999 | Blumenau |
| 5,933,104 A | 8/1999 | Kimura |
| 5,936,871 A | 8/1999 | Pan et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,995,091 A | 11/1999 | Near et al. |
| 5,999,629 A | 12/1999 | Heer et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,026,414 A | 2/2000 | Anglin |
| 6,041,334 A | 3/2000 | Cannon |
| 6,052,735 A | 4/2000 | Ulrich et al. |
| 6,058,494 A | 5/2000 | Gold et al. |
| 6,076,148 A | 6/2000 | Kedem et al. |
| 6,094,416 A | 7/2000 | Ying |
| 6,094,684 A | 7/2000 | Pallmann |
| 6,101,255 A | 8/2000 | Harrison et al. |
| 6,105,129 A | 8/2000 | Meier et al. |
| 6,105,150 A | 8/2000 | Noguchi et al. |
| 6,112,239 A | 8/2000 | Kenner et al. |
| 6,122,668 A | 9/2000 | Teng et al. |
| 6,131,095 A | 10/2000 | Low et al. |
| 6,131,190 A | 10/2000 | Sidwell |
| 6,137,864 A | 10/2000 | Yaker |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,175,829 B1 | 1/2001 | Li et al. |
| 6,212,512 B1 | 4/2001 | Barney et al. |
| 6,230,164 B1 | 5/2001 | Rekieta et al. |
| 6,260,069 B1 | 7/2001 | Anglin |
| 6,269,431 B1 | 7/2001 | Dunham |
| 6,275,953 B1 | 8/2001 | Vahalia et al. |
| 6,292,783 B1 | 9/2001 | Rohler |
| 6,295,541 B1 | 9/2001 | Bodnar et al. |
| 6,301,592 B1 | 10/2001 | Aoyama et al. |
| 6,304,880 B1 | 10/2001 | Kishi |
| 6,324,581 B1 | 11/2001 | Xu et al. |
| 6,328,766 B1 | 12/2001 | Long |
| 6,330,570 B1 | 12/2001 | Crighton |
| 6,330,572 B1 | 12/2001 | Sitka |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,374,266 B1 | 4/2002 | Shnelvar |
| 6,374,336 B1 | 4/2002 | Peters et al. |
| 6,381,331 B1 | 4/2002 | Kato |
| 6,385,673 B1 | 5/2002 | DeMoney |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,430,183 B1 * | 8/2002 | Satran et al. .................. 370/389 |
| 6,438,586 B1 | 8/2002 | Hass et al. |
| 6,487,561 B1 | 11/2002 | Ofek et al. |
| 6,487,644 B1 | 11/2002 | Huebsch et al. |
| 6,505,307 B1 | 1/2003 | Stell et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |

| | | | |
|---|---|---|---|
| 6,564,228 B1 | 5/2003 | O'Connor |
| 6,571,310 B1 | 5/2003 | Ottesen |
| 6,577,734 B1 | 6/2003 | Etzel et al. |
| 6,581,143 B2 | 6/2003 | Gagne et al. |
| 6,604,149 B1 | 8/2003 | Deo et al. |
| 6,631,442 B1 | 10/2003 | Blumenau |
| 6,631,493 B2 | 10/2003 | Ottesen et al. |
| 6,647,396 B2 | 11/2003 | Parnell et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,675,177 B1 | 1/2004 | Webb |
| 6,732,124 B1 | 5/2004 | Koseki et al. |
| 6,742,092 B1 | 5/2004 | Huebsch et al. |
| 6,757,794 B2 | 6/2004 | Cabrera et al. |
| 6,763,351 B1 | 7/2004 | Subramaniam et al. |
| 6,772,332 B1 | 8/2004 | Boebert et al. |
| 6,785,786 B1 | 8/2004 | Gold et al. |
| 6,789,161 B1 | 9/2004 | Blendermann et al. |
| 6,791,910 B1 | 9/2004 | James et al. |
| 6,859,758 B1 | 2/2005 | Prabhakaran et al. |
| 6,871,163 B2 | 3/2005 | Hiller et al. |
| 6,880,052 B2 | 4/2005 | Lubbers et al. |
| 6,886,020 B1 | 4/2005 | Zahavi et al. |
| 6,909,722 B1 | 6/2005 | Li |
| 6,928,513 B2 | 8/2005 | Lubbers et al. |
| 6,952,758 B2 | 10/2005 | Chron et al. |
| 6,965,968 B1 | 11/2005 | Touboul et al. |
| 6,968,351 B2 | 11/2005 | Butterworth |
| 6,973,553 B1 | 12/2005 | Archibald, Jr. et al. |
| 6,983,351 B2 | 1/2006 | Gibble et al. |
| 7,003,519 B1 | 2/2006 | Biettron et al. |
| 7,003,641 B2 | 2/2006 | Prahlad et al. |
| 7,035,880 B1 | 4/2006 | Crescenti et al. |
| 7,062,761 B2 | 6/2006 | Slavin et al. |
| 7,069,380 B2 | 6/2006 | Ogawa et al. |
| 7,085,904 B2 | 8/2006 | Mizuno et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,117,246 B2 | 10/2006 | Christenson et al. |
| 7,120,757 B2 | 10/2006 | Tsuge |
| 7,130,970 B2 | 10/2006 | Devassy et al. |
| 7,155,465 B2 | 12/2006 | Lee et al. |
| 7,155,633 B2 | 12/2006 | Tuma et al. |
| 7,159,110 B2 | 1/2007 | Douceur et al. |
| 7,174,433 B2 | 2/2007 | Kottomtharayil et al. |
| 7,209,972 B1 | 4/2007 | Ignatius et al. |
| 7,246,140 B2 | 7/2007 | Therrien et al. |
| 7,246,207 B2 | 7/2007 | Kottomtharayil et al. |
| 7,246,272 B2 | 7/2007 | Cabezas et al. |
| 7,269,612 B2 | 9/2007 | Devarakonda et al. |
| 7,272,606 B2 | 9/2007 | Borthakur et al. |
| 7,277,941 B2 | 10/2007 | Ignatius et al. |
| 7,278,142 B2 | 10/2007 | Bandhole et al. |
| 7,287,047 B2 | 10/2007 | Kavuri |
| 7,287,252 B2 | 10/2007 | Bussiere et al. |
| 7,293,133 B1 | 11/2007 | Colgrove et al. |
| 7,298,846 B2 | 11/2007 | Bacon et al. |
| 7,315,923 B2 | 1/2008 | Retnamma et al. |
| 7,346,623 B2 | 3/2008 | Prahlad et al. |
| 7,359,917 B2 | 4/2008 | Winter et al. |
| 7,380,072 B2 | 5/2008 | Kottomtharayil et al. |
| 7,398,429 B2 | 7/2008 | Shaffer et al. |
| 7,401,154 B2 | 7/2008 | Ignatius et al. |
| 7,409,509 B2 | 8/2008 | Devassy et al. |
| 7,448,079 B2 | 11/2008 | Tremain |
| 7,454,569 B2 | 11/2008 | Kavuri et al. |
| 7,457,933 B2 | 11/2008 | Pferdekaemper et al. |
| 7,467,167 B2 | 12/2008 | Patterson |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,500,053 B1 | 3/2009 | Kavuri et al. |
| 7,500,150 B2 | 3/2009 | Sharma et al. |
| 7,509,019 B2 | 3/2009 | Kaku |
| 7,519,726 B2 | 4/2009 | Palliyll et al. |
| 7,523,483 B2 | 4/2009 | Dogan |
| 7,529,748 B2 | 5/2009 | Wen et al. |
| 7,536,291 B1 | 5/2009 | Retnamma et al. |
| 7,546,324 B2 | 6/2009 | Prahlad et al. |
| 7,546,482 B2 | 6/2009 | Blumenau et al. |
| 7,581,077 B2 | 8/2009 | Ignatius et al. |
| 7,596,586 B2 | 9/2009 | Gokhale et al. |
| 7,613,748 B2 | 11/2009 | Brockway et al. |
| 7,627,598 B1 | 12/2009 | Burke |
| 7,627,617 B2 | 12/2009 | Kavuri et al. |
| 7,631,194 B2 | 12/2009 | Wahlert et al. |
| 7,685,126 B2 | 3/2010 | Patel et al. |
| 7,739,381 B2 | 6/2010 | Ignatius et al. |
| 7,765,369 B1 | 7/2010 | Prahlad et al. |
| 7,809,914 B2 | 10/2010 | Kottomtharayil et al. |
| 7,831,553 B2 | 11/2010 | Prahlad et al. |
| 7,840,537 B2 | 11/2010 | Gokhale et al. |
| 7,861,050 B2 | 12/2010 | Retnamma et al. |
| 7,962,642 B2 | 6/2011 | Ignatius et al. |
| 8,019,963 B2 | 9/2011 | Ignatius et al. |
| 8,131,964 B2 | 3/2012 | Retnamma et al. |
| 8,239,654 B2 | 8/2012 | Ignatius et al. |
| 8,326,915 B2 | 12/2012 | Ignatius et al. |
| 2002/0029281 A1 | 3/2002 | Zeidner et al. |
| 2002/0040405 A1 | 4/2002 | Gold |
| 2002/0042869 A1 | 4/2002 | Tate et al. |
| 2002/0042882 A1 | 4/2002 | Dervan et al. |
| 2002/0049778 A1 | 4/2002 | Bell et al. |
| 2002/0065967 A1 | 5/2002 | MacWilliams et al. |
| 2002/0107877 A1 | 8/2002 | Whiting et al. |
| 2002/0194340 A1 | 12/2002 | Ebstyne et al. |
| 2002/0198983 A1 | 12/2002 | Ullmann et al. |
| 2003/0014433 A1 | 1/2003 | Teloh et al. |
| 2003/0016609 A1 | 1/2003 | Rushton et al. |
| 2003/0061491 A1 | 3/2003 | Jaskiewicz et al. |
| 2003/0066070 A1 | 4/2003 | Houston |
| 2003/0079112 A1 | 4/2003 | Sachs et al. |
| 2003/0169733 A1 | 9/2003 | Gurkowski et al. |
| 2004/0073716 A1 | 4/2004 | Boom et al. |
| 2004/0088432 A1 | 5/2004 | Hubbard et al. |
| 2004/0107199 A1 | 6/2004 | Dairymple et al. |
| 2004/0193953 A1 | 9/2004 | Callahan et al. |
| 2004/0210796 A1 | 10/2004 | Largman et al. |
| 2004/0225834 A1* | 11/2004 | Lu et al. ............ 711/114 |
| 2005/0033756 A1 | 2/2005 | Kottomtharayil et al. |
| 2005/0114406 A1 | 5/2005 | Borthakur et al. |
| 2005/0114477 A1 | 5/2005 | Willging et al. |
| 2005/0166011 A1 | 7/2005 | Burnett et al. |
| 2005/0172093 A1 | 8/2005 | Jain |
| 2005/0246510 A1 | 11/2005 | Retnamma et al. |
| 2005/0246568 A1 | 11/2005 | Davies |
| 2005/0256972 A1 | 11/2005 | Cochran et al. |
| 2005/0262296 A1 | 11/2005 | Peake |
| 2005/0268068 A1 | 12/2005 | Ignatius et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0044674 A1 | 3/2006 | Martin et al. |
| 2006/0129768 A1 | 6/2006 | Pferdekaemper et al. |
| 2006/0149889 A1 | 7/2006 | Sikha |
| 2006/0224846 A1 | 10/2006 | Amarendran et al. |
| 2007/0288536 A1 | 12/2007 | Sen et al. |
| 2008/0059515 A1 | 3/2008 | Fulton |
| 2008/0229037 A1 | 9/2008 | Bunte et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0256173 A1 | 10/2008 | Ignatius et al. |
| 2009/0319534 A1 | 12/2009 | Gokhale |
| 2009/0319585 A1 | 12/2009 | Gokhale |
| 2010/0005259 A1 | 1/2010 | Prahlad |
| 2010/0131461 A1 | 5/2010 | Prahlad et al. |
| 2012/0166745 A1 | 6/2012 | Retnamma et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |

| | | |
|---|---|---|
| EP | 0981090 | 2/2000 |
| EP | 1174795 | 1/2002 |
| EP | 1115064 | 12/2004 |
| GB | 2366048 | 2/2002 |
| WO | WO 95/13580 | 5/1995 |
| WO | WO 98/39707 | 9/1998 |
| WO | WO 98/39709 | 9/1998 |
| WO | WO 99/12098 | 3/1999 |
| WO | WO 99/14692 | 3/1999 |
| WO | WO 99/17204 | 4/1999 |
| WO | WO 02/05466 | 1/2002 |
| WO | WO 2004/090788 | 10/2004 |
| WO | WO 2005/055093 | 6/2005 |

OTHER PUBLICATIONS

U.S. Appl. No. 11/269,513, filed Nov. 7, 2005, Prahlad, et al.
U.S. Appl. No. 11/269,520, filed Nov. 7, 2005, Gokhale, et al.
U.S. Appl. No. 11/738,914, filed Apr. 23, 2007, Ignatius, Paul et al.
Armstead et al., "Implementation of a Campus-Wide Distributed Mass Storage Service: The Dream vs. Reality," IEEE, 1995, pp. 190-199.
Arneson, "Development of Omniserver; Mass Storage Systems," Control Data Corporation, 1990, pp. 88-93.
Arneson, Mass Storage Archiving in Network Environments, Institute of Electrical and Electronics Engineers (IEEE), 1998, pp. 45-50.
Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5-9, 1995, pp. 420-427, San Francisco, CA.
Canadian Office Action, Application No. CA/2499073, dated Dec. 24, 2010.
Canadian Office Action, Application No. CA/2499073, dated Oct. 7, 2009.
Canadian Office Action, Application No. CA/2544063, dated Dec. 10, 2009.
Commvault Systems, Inc., Continuous Data Replicator 7.0, Product Data Sheet, 2007.
Eitel, "Backup and Storage Management in Distributed Heterogeneous Environments," IEEE, 1994, pp. 124-126.
European Office Action, Application No. EP/019067693, dated Aug. 12, 2009.
European Office Action, Application No. EP/019067693, dated Sep. 24, 2007.
Farley, "Building Storage Networks," pp. 328-331, Osborne/McGraw-Hill, 2000.
Gait, "The Optical File Cabinet: A Random-Access File System for Write-Once Optical Disks," Institute of Electrical and Electronics Engineers (IEEE) Computer, 1988, vol. 21, Issue 6, pp. 11-22.
Gibson, "Network Attached Storage Architecture," pp. 37-45, ACM, Nov. 2000.
Great Britain Office Action, Application No. GB/06116685, dated Nov. 14, 2006.
http://en.wikipedia.org/wiki/Naive_Bayes_classifier, printed on Jun. 1, 2010, in 7 pages.
Indian Office Action, Application No. IN/1625/KOLNP/2006, dated May 10, 2010.
Indian Office Action, Application No. IN/656/CHENP/2005, dated Jun. 29, 2006.
International Search Report and International Preliminary Report on Patentability, PCT/US2003/029105, dated Dec. 4, 2005.
International Search Report and Written Opinion dated Nov. 13, 2009, PCT/US2007/081681.
International Search Report, PCT/US2001/002931, dated Jun. 3, 2002.
Israeli Office Action, Application No. IL/175036, dated Jul. 6, 2010.
Jander, "Launching Storage-Area Net," Data Communications, US, McGraw Hill, NY, vol. 27, No. 4(Mar. 21, 1998), pp. 64-72.
Recycle Bin (Windows), Aug. 2007, Wikipedia, pp. 1-3.
Rosenblum et al., "The Design and Implementation of a Log-Structure File System," Operating Systems Review SIGOPS, vol. 25, No. 5, New York, US, pp. 1-15 (May 1991).
Szor, The Art of Virus Research and Defense, Symantec Press (2005) ISBN 0-321-30454-3.
Witten et al., Data Mining: Practical Machine Learning Tools and Techniques, Ian H. Witten & Eibe Frank, Elsevier (2005) ISBN 0-12-088407-0.
Written Opinion; International Application No. PCT/US05/40606; mailed Feb. 14, 2007; 5 pages.
Written Opinion; International Application No. PCT/US05/40606; mailed Mar. 1, 2007; 5 pages.
U.S. Appl. No. 13/691,506, filed Nov. 30, 2012, Ignatius, et al.
PCT International Search Report and Written Opinion for International Application No. PCT/US2007/81681, Mail Date Nov. 13, 2009, 4 pages.

* cited by examiner

SYSTEMS AND METHODS FOR COMBINING DATA STREAMS IN A STORAGE OPERATION

RELATED APPLICATIONS

This application is a continuation of U.S. patent application Ser. No. 12/969,389, filed Dec. 15, 2010, which is a continuation of U.S. patent application Ser. No. 11/954,176, filed Dec. 11, 2007, which is a continuation of U.S. patent application Ser. No. 10/990,357, filed Nov. 15, 2004, which claims the benefit of U.S. Provisional Patent Application No. 60/519,526, titled SYSTEM AND METHOD FOR PERFORMING PIPELINED STORAGE OPERATIONS IN A STORAGE NETWORK, filed Nov. 13, 2003, each of which is hereby incorporated herein by reference in its entirety.

This application is also related to the following patents and pending applications, each of which is hereby incorporated herein by reference in its entirety:

U.S. patent application Ser. No. 10/990,284, titled SYSTEM AND METHOD FOR PROVIDING ENCRYPTION IN PIPELINED STORAGE OPERATIONS IN A STORAGE NETWORK, filed Nov. 15, 2004, now U.S. Pat. No. 7,277,941, issued Oct. 2, 2007;

U.S. Pat. No. 6,418,478, titled PIPELINED HIGH SPEED DATA TRANSFER MECHANISM, issued Jul. 9, 2002;

U.S. patent application Ser. No. 09/495,751, titled HIGH SPEED TRANSFER MECHANISM, filed Feb. 1, 2000, now U.S. Pat. No. 7,209,972, issued Apr. 24, 2007;

U.S. patent application Ser. No. 09/610,738, titled MODULAR BACKUP AND RETRIEVAL SYSTEM USED IN CONJUNCTION WITH A STORAGE AREA NETWORK, filed Jul. 6, 2000, now U.S. Pat. No. 7,035,880, issued Apr. 25, 2006;

U.S. patent application Ser. No. 09/774,268, titled LOGICAL VIEW AND ACCESS TO PHYSICAL STORAGE IN MODULAR DATA AND STORAGE MANAGEMENT SYSTEM, filed Jan. 30, 2001, now U.S. Pat. No. 6,542,972, issued Apr. 1, 2003;

U.S. patent application Ser. No. 10/658,095, titled DYNAMIC STORAGE DEVICE POOLING IN A COMPUTER SYSTEM, filed Sep. 9, 2003, now U.S. Pat. No. 7,130,970, issued Oct. 31, 2006; and U.S. Provisional Patent Application No. 60/460,234, titled SYSTEM AND METHOD FOR PERFORMING STORAGE OPERATIONS IN A COMPUTER NETWORK, filed Apr. 3, 2003.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND

Backup operations for client data on a storage network are often performed on streams of data which are managed by subclients and sent to a backup drive or media device. Typically, on a given stream, only one sub client can perform a backup at any given time. The concurrency limit for the number of backups that can go to a stream at any given time is one. Indirectly this means that only one backup can be sent to a media or drive at any point.

This limitation has a major drawback. With tape speeds in media increasing and the difference between disk speed and tape speed widening, the tape throughput is being throttled by the slower disks. This becomes a major issue in a large enterprise where there are many clients with slow, under performing disks with large amounts of data that need to be backed up in a fixed backup window. The only way the backup window can be met is by backing up these clients, each to a different piece of media in different drives. This increases the hardware requirement costs. This also can create a "shoe shining" effect in which the tape is driven back and forth since drive capacity is under-utilized at certain times.

Tape capacity is also growing and data from multiple clients can actually fit on a single piece of media especially if the backup being performed is an incremental backup. Scattering data across many pieces of media is a tape-handling nightmare for backup administrators.

SUMMARY OF THE INVENTION

In accordance with embodiments of the invention, a method is provided for performing a backup operation on a plurality of data streams containing data to be backed up. In one embodiment, the method involves combining the data streams into a single stream of one or more data chunks, including by writing data from more than one of the data streams into at least one data chunk. The combining may be done by multiplexing the data streams. The method further involves transmitting the one or more data chunks over a transport channel to a backup medium and storing the one or more data chunks on the backup medium.

Data from the data streams may be written into a data chunk until the data chunk reaches a predetermined size, or until a configurable time interval has lapsed, or otherwise in accordance with a storage policy as disclosed in some of the pending applications referenced above, and as discussed herein.

During a restore operation or during an operation to create an auxiliary backup copy, the data chunk is retrieved from the backup medium and data from the separate data streams are separated from the data chunk. All data streams written into a data chunk may be separated from each other into separate data stream portions. When the data streams have been multiplexed, separating involves demultiplexing the data streams written into the data chunk. The separated data streams may be restored to a client or further stored as auxiliary copies of the data streams.

In some embodiments, the data streams contain data from a plurality of archive files. Combining the data streams thus may involve writing data from more than one archive files into at least one data chunk, and may further involve writing data from a single archive file into more than one data chunk. In these embodiments, a plurality of tag headers are inserted into the data chunk, each tag header describing data written in the data chunk from a corresponding archive file. Data may be written into a data chunk until the end of an archive file has been reached. When the data chunk is retrieved, from the backup medium, the data from at least one of the archive files is separated from the data chunk, or all the archive files may be separated into separate archive file portions, using the tag headers when necessary to identify and describe the separate archive file portions. The archive file portions may then be restored to a client or may be stored on an auxiliary storage device which may be accessed in turn during a restore operation of a given archive file requested by a client.

In accordance with some embodiments, the invention provides a system for performing a backup operation on a plurality of data streams containing data to be backed up. The system includes one or more receivers for receiving the data streams, a multiplexer for combining the data streams into a combined data stream, a data writer for writing data from the combined data stream portion of the combined data streams into one or more data chunks, and one or more backup media for storing the one or more data chunks. The system may further include a transport channel for transporting the data chunks from the data writer to the backup media.

In accordance with further aspects of embodiments of the present invention, a data structure is provided for a data chunk stored on a memory device. The data chunk data structure is used by a computer system to backup data and includes a plurality of portions of data from different archive files written into the data chunk from multiplexed data streams containing the archive files and a plurality of tag headers each describing one of the archive file portions written into the data chunk.

DETAILED DESCRIPTION OF THE PREFERRED EMBODIMENT

The present invention includes methods and systems operating in conjunction with a modular storage system to enable computers on a network to share storage devices on a physical and logical level. An exemplary modular storage system is the GALAXY backup and retrieval system and QINETIX storage management system available from CommVault Systems of New Jersey. The modular architecture underlying this system is described in the above referenced patent applications, each of which is incorporated herein.

Figure 1:
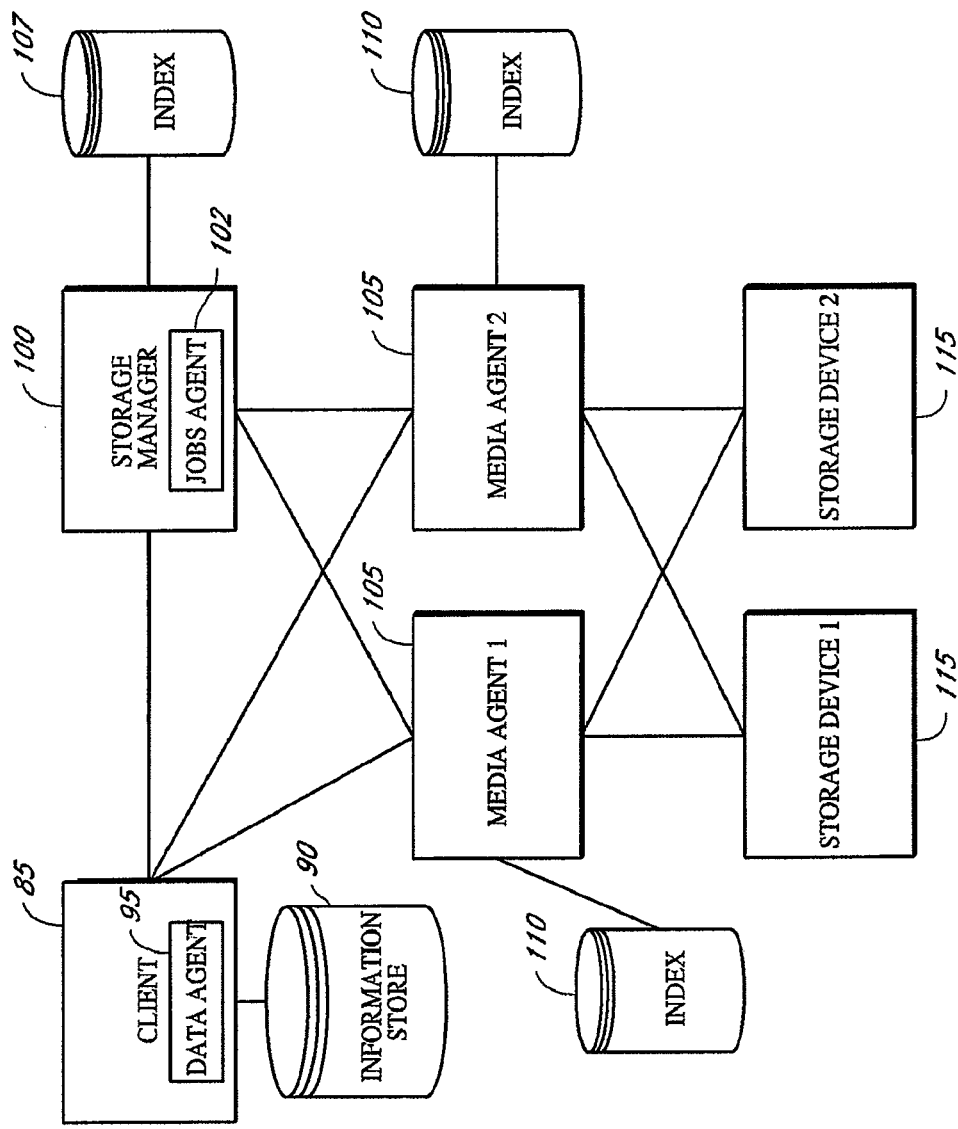
FIG. 1 presents a block diagram of a network architecture for a system to perform storage operations on electronic data in a computer network according to an embodiment of the invention.

Preferred embodiments of the invention are now described with reference to the drawings. An embodiment of the system of the present invention is shown in FIG. 1. As shown, the system includes a client 85, a data agent 95, an information store 90, a storage manager (or storage management component) 100, a jobs agent 102, a storage manager index 107, one or more media management components (or media agent) 105, one or more media agent indexes 110, and one or more storage devices 115. Although FIG. 1 depicts a system having two media agents 105, there may be one media agent 105, or a plurality of media agents 105 providing communication between the client 85, storage manager 100 and the storage devices 115. In addition, the system can include one or a plurality of storage devices 115.

A client 85 can be any networked client 85 and preferably includes at least one attached information store 90. The information store 90 may be any memory device or local data storage device known in the art, such as a hard drive, CD-ROM drive, tape drive, random access memory (RAM), or other types of magnetic, optical, digital and/or analog local storage. In some embodiments of the invention, the client 85 includes at least one data agent 95, which is a software module that is generally responsible for performing storage operations on data of a client 85 stored in information store 90 or other memory location. Storage operations include, but are not limited to, creation, storage, retrieval, migration, deletion, and tracking of primary or production volume data, secondary volume data, primary copies, secondary copies, auxiliary copies, snapshot copies, backup copies, incremental copies, differential copies, synthetic copies, hierarchical storage management (HSM) copies, archive copies, information lifecycle management (ILM) copies, and other types of copies and versions of electronic data. In some embodiments of the invention, the system provides at least one, and typically a plurality of data agents 95 for each client, each data agent 95 is intended to backup, migrate, and recover data associated with a different application. For example, a client 85 may have different individual data agents 95 designed to handle Microsoft Exchange data, LOTUS NOTES data, MICROSOFT WINDOWS file system data, MICROSOFT ACTIVE DIRECTORY Objects data, and other types of data known in the art.

The storage manager 100 is generally a software module or application that coordinates and controls the system, for example, the storage manager 100 manages and controls storage operations performed by the system. The storage manager 100 communicates with all components of the system including client 85, data agent 95, media agent 105, and storage devices 115 to initiate and manage storage operations. The storage manager 100 preferably has an index 107, further described herein, for storing data related to storage operations. In general, the storage manager 100 communicates with storage devices 115 via a media agent 105. In some embodiments, the storage manager 100 communicates directly with the storage devices 115.

The system includes one or more media agent 105. The media agent 105 is generally a software module that conducts data, as directed by the storage manager 100, between the client 85 and one or more storage devices 115, for example, a tape library, a hard drive, a magnetic media storage device, an optical media storage device, or other storage device. The media agent 105 is communicatively coupled with and controls the storage device 115. For example, the media agent 105 might instruct a storage device 115 to perform a storage operation, e.g., archive, migrate, or restore application specific data. The media agent 105 generally communicates with the storage device 115 via a local bus such as a SCSI adaptor.

Each media agent 105 maintains an index cache 110 which stores index data that the system generates during storage operations as further described herein. For example, storage operations for Microsoft Exchange data generate index data. Media management index data includes, for example, information regarding the location of the stored data on a particular media, information regarding the content of the information stored such as file names, sizes, creation dates, formats, application types, and other file-related criteria, information regarding one or more clients associated with the information stored, information regarding one or more storage policies, storage criteria, or storage preferences associated with the information stored, compression information, retention-related information, encryption-related information, stream-related information, and other types of information. Index data thus provides the system with an efficient mechanism for performing storage operations including locating user files for recovery operations and for managing and tracking stored data.

The system generally maintains two copies of the media management index data regarding particular stored data. A first copy is generally stored with the data copied to a storage device 115. Thus, a tape may contain the stored data as well as index information related to the stored data. In the event of a system restore, the index information stored with the stored data can be used to rebuild a media agent index 110 or other index useful in performing storage operations. In addition, the media agent 105 that controls the storage operation also generally writes an additional copy of the index data to its index cache 110. The data in the media agent index cache 110 is generally stored on faster media, such as magnetic media, and is thus readily available to the system for use in storage operations and other activities without having to be first retrieved from the storage device 115.

The storage manager 100 also maintains an index cache 107. Storage manager index data is used to indicate, track, and associate logical relationships and associations between components of the system, user preferences, management tasks, and other useful data. For example, the storage manager 100 might use its index cache 107 to track logical associations between media agent 105 and storage devices 115. The storage manager 100 may also use its index cache 107 to track the status of storage operations to be performed, storage patterns associated with the system components such as media use, storage growth, network bandwidth, service level agreement (SLA) compliance levels, data protection levels, storage policy information, storage criteria associated with user preferences, retention criteria, storage operation preferences, and other storage-related information.

A storage policy is generally a data structure or other information which includes a set of preferences and other storage criteria for performing a storage operation. The preferences and storage criteria may include, but are not limited to: a storage location, relationships between system components, network pathway to utilize, retention policies, data characteristics, compression or encryption requirements, preferred system components to utilize in a storage operation, and other criteria relating to a storage operation. A storage policy may be stored to a storage manager index, to archive media as metadata for use in restore operations or other storage operations, or to other locations or components of the system.

Index caches 107 and 110 typically reside on their corresponding storage component's hard disk or other fixed storage device. For example, the jobs agent 102 of a storage manager 100 may retrieve storage manager index 107 data regarding a storage policy and storage operation to be performed or scheduled for a particular client 85. The jobs agent 102, either directly or via another system module, communicates with the data agent 95 at the client 85 regarding the storage operation. In some embodiments, the jobs agent 102 also retrieves from the index cache 107 a storage policy associated with the client 85 and uses information from the storage policy to communicate to the data agent 95 one or more media agents 105 associated with performing storage operations for that particular client 85 as well as other information regarding the storage operation to be performed such as retention criteria, encryption criteria, streaming criteria, etc. The data agent 95 then packages or otherwise manipulates the client information stored in the client information store 90 in accordance with the storage policy information and/or according to a user preference, and communicates this client data to the appropriate media agent(s) 100 for processing. The media agent(s) 105 store the data according to storage preferences associated with the storage policy including storing the generated index data with the stored data, as well as storing a copy of the generated index data in the media agent index cache 110.

In some embodiments, components of the system may reside and execute on the same computer. In some embodiments, a client component such as a data agent 95, a media agent 105, or a storage manager 100 coordinates and directs local archiving, migration, and retrieval application functions as further described in U.S. patent application Ser. No. 09/610,738, now U.S. Pat. No. 7,035,880, issued Apr. 25, 2006. These client components can function independently or together with other similar client components.

Data and other information is transported throughout the system via buffers and network pathways including, among others, a high-speed data transfer mechanism, such as the CommVault DATAPIPE, as further described in U.S. Pat. No. 6,418,478 and U.S. patent application Ser. No. 09/495,751, now U.S. Pat. No. 7,209,972, issued Apr. 24, 2007, each of which is hereby incorporated herein by reference in its entirety. Self describing tag headers are disclosed in these applications wherein data is transferred between a flexible grouping of data transport modules each supporting a separate function and leveraging buffers in a shared memory space. Thus, a data transport module receives a chunk of data and decodes how the data should be processed according to information contained in the chunk's header, and in some embodiments, the chunk's trailer. U.S. Pat. No. 6,418,478 and U.S. patent application Ser. No. 09/495,751, now U.S. Pat. No. 7,209,972, issued Apr. 24, 2007, generally address "logical data" transported via Transmission Control Protocol Internet Protocol (TCP/IP), however, embodiments of the invention herein are also contemplated which are directed to transporting, multiplexing, encrypting, and generally processing block level data as disclosed, for example, in U.S. patent application Ser. No. 10/803,542, filed Mar. 18, 2004, titled METHOD AND SYSTEM FOR TRANSFERRING DATA IN A STORAGE OPERATION, now abandoned, which is hereby incorporated herein by reference in its entirety.

As discussed, these applications generally disclose systems and methods of processing logical data. Thus, for example, contiguous blocks of data from a file might be written on a first volume as blocks 1, 2, 3, 4, 5, etc. The operating system of the host associated with the first volume would assist in packaging the data adding additional OS-specific information to the chunks. Thus, when transported and stored on a second volume, the blocks might be written to the second in a non-contiguous order such as blocks 2, 1, 5, 3, 4. On a restore storage operation, the blocks could (due to the OS-specific information and other information) be restored to the first volume in contiguous order, but there was no control over how the blocks were laid out or written to the second volume. Incremental block level backups of file data was therefore extremely difficult if not impossible in such a system since there was no discernable relationship between how blocks were written on the first volume and how they were written on the second volume.

Thus, in some embodiments, the system supports transport and incremental backups (and other storage operations) of block level data via a TCP/IP (and other transport protocols) over a local area network (LAN), wide area network (WAN), storage area network (SAN), etc. Additional data is added to the multi-tag header discussed in the applications referenced above which communicates how each block was written on the first volume. Thus, for example, a header might contain a file map of how the blocks were written on the first volume and the map could be used to write the blocks in similar order on the second volume. In other embodiments, each chunk header might contain a pointer or other similar data structure indicating the chunk's position relative to other chunks in the file. Thus, when a file block or other block changed on the first volume, the system could identify and update the corresponding copy of the block located on the second volume and effectively perform an incremental backup or other storage operation.

In the system, for example as in the CommVault GALAXY system, archives are grouped by storage policy. Many clients/sub clients can point to the same storage policy. Each storage policy has a primary copy and zero or more secondary copies. Each copy has one or more streams related to the number of drives in a drive pool.

The system uses a tape media to its maximum capacity and throughput by multiplexing data from several clients onto the same media at the same time. The system allows for a stream to be reserved more than once by different clients and have multiple data movers write to this same piece of media.

During backup or other storage operations, data from a data agent to a media agent is transferred over a "Data pipeline" as further described herein and in U.S. Pat. No. 6,418,478 and U.S. patent application Ser. No. 09/495,751, now U.S. Pat. No. 7,209,972, issued Apr. 24, 2007. One or more transport processes or modules, such as the Dsbackup in the CommVault GALAXY system, form the tail end on the Media Agent for the pipeline. For example, in the GALAXY system, the Datamover process running as part of Dsbackup is responsible for writing data to the media. For data multiplexing, many such Data movers belonging to different pipelines have to write to the same piece of media. This can be achieved by splitting the Datamover pipeline process into multiple components including a data receiver, a data writer, and other modules as necessary.

Figure 2:
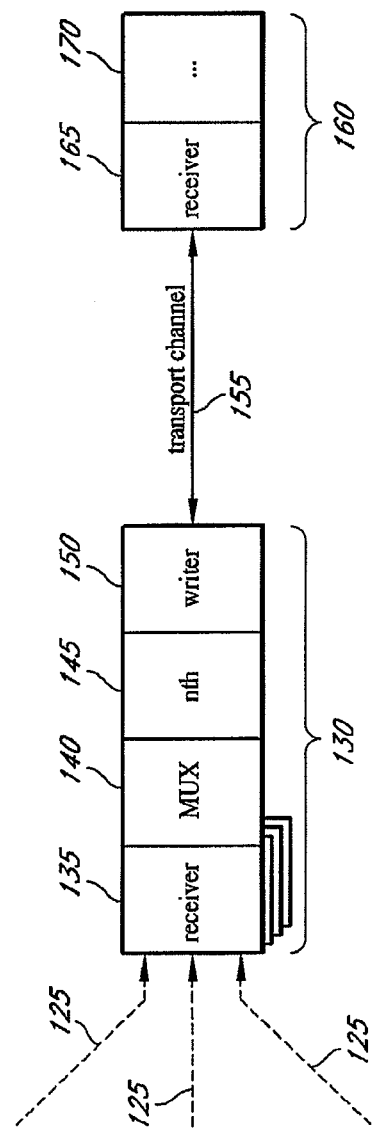
FIG. 2 presents a flow diagram of a system for multiplexing pipelined data according to an embodiment of the invention.

FIG. 2 presents a system for multiplexing pipelined data according to an embodiment of the invention. As shown, FIG. 2 includes various data streams 125 in communication with a transmit data pipeline 130 that includes one or more data receiver modules 135, a multiplexing module 140, additional modules 145, and a data writer module 150. FIG. 2 also includes a transport channel 155 from the transmit pipeline 130 to a receive pipeline 160 that includes a second receiver module 165 and other modules 170.

Backup streams 125 are fed into the transmit pipeline 130. For example, in some embodiments, a backup process, such as the Dsbackup process in the CommVault GALAXY system, packages file data and other data into chunks and communicates the chunks via the backup streams 125. Thus, the transmit pipeline 130 or tail end of the pipeline copies the data received in pipeline buffers from the backup process via the backup data streams 125. A data receiver 135 processes the data received from each backup stream 125. In some embodiments, there is one data receiver 135 per backup stream 125, thus in the case of multiple backup streams 135, the system might contain multiple data receiver modules 135.

A multiplexing module 140 combines the data received by the receiver module(s) 135 into a single stream of chunks as further described herein. Thus, the multiplexing module 140 may combine data from multiple archive files into a single chunk. Additional modules 145 perform other operations on the chunks of data to be transported such as encryption, compression, etc. as further described herein, in U.S. Pat. No. 6,418,478; U.S. patent application Ser. No. 09/495,751, now U.S. Pat. No. 7,209,972, issued Apr. 24, 2007; and U.S. patent application Ser. No. 10/990,284, now U.S. Pat. No. 7,277,941, issued Oct. 2, 2007.

The data writer module 150 communicates the chunks of data from the transmit pipeline 130 over a transport channel 155 to the receive pipeline 160. The transport channel may comprise a buffer, a bus, a fiber optic channel, a LAN, a SAN, a WAN, a wireless communication medium, or other transport methods known in the art. There is generally one data writer 150 per media (not shown) that receives data from multiple data receivers 135 and writes data to the media. The data writer process 150 is generally invoked when the first pipeline is established to use a given media and generally remains running until all the pipelines backing up to this media are finished. The data writer 150 writes the data to media or to the receive pipeline 160 and closes a chunk when the chunk size is reached, the chunk size being a design parameter set to allow only certain size chunks for transmission over the datapipe. In some embodiments, the data writer 150 also updates the Archive Manager tables with the chunk information. A multiplexed chunk thus will contain data from many archive files.

In some embodiments, the transmit pipeline receives data directly from the system's data agents and writes multiplexed data to the media directly without an intervening receive pipeline 160. Thus, in some embodiments, a single pipeline is also contemplated. In embodiments that include both a transmit pipeline 130 and a receive pipeline 160, the receive pipeline 160 processes data received from the transmit pipeline 130 for storage to media, etc. A second data receiver 165 processes data received from the data writer 150 and additional modules 170 which may include encryption, decryption, compression, decompression modules, etc. further process the data before it is written to the storage media by a final data writer module (not shown).

In some embodiments, Data Multiplexing is a property of a Storage Policy. Any storage policy with Data Multiplexing enabled has the ability to start backups for multiple sub clients to run simultaneously to the same media. In some embodiments, a resource manager process on the storage manager allows for multiple volume reservation for media belonging to storage policies with data multiplexing enabled.

During a restore storage operation, the process is essentially reversed. Data is retrieved from the storage media and passed back through the pipeline to the original volume. Thus, during a restore, a data reader module (e.g.—a data receiver directed to also retrieve data from storage) identifies the data by the looking into the tag header of each retrieved chunk. Any offset into the chunk is a relative offset i.e. when restoring data from a given archive file all the data buffers encountered from a different archive file should not be counted into the offset calculation and should be thrown out. Data within each volume block size of data will contain data from different Archive files. The tag header also contains the archive file id. In addition, all the offsets stored are relative offset within an archive file and does not depend on actual physical location on the tape or other storage media.

A more detailed description of data multiplexing according to embodiments of the invention is now described:

A single backup is made up of one or more archive files. An archive file is made up of the smallest restorable component called the "chunk". The chunk always belonged to only one archive file. With data multiplexing a chunk interleaves pipeline buffers from different pipelines. A tag header written for each buffer of data will uniquely identify the data to the archive file. The tag header contains the archive file id (serial ID) from the database corresponding to the archive file being backed up.

In some embodiments, for example in the CommVault GALAXY system, one or more modules in the pipeline, such as the DsBackup module, package data or otherwise retrieve data from a primary volume to be backed up and from the pipeline, and sends the data to the DataMover or receive pipeline. DsBackup also initializes indexes and updates the index cache every time it receives a file header from a client. DataMover responsibility is to organize the data received from the dsBackup into chunks, start a new chunk when the size of the chunk reaches the predetermined value, update the archive manager tables information about the chunks and their location on that tape, also handle end of media conditions and media reservations. DataMover uses the MediaFileSystem object, for example I/O system API calls of a media agent or other system component, to write data on to the tape and read data from the tape. MediaFileSystem has a Write buffer and data is written onto the tape when this write buffer is filled with data.

With the new data Multiplexing model of DataMover, the previous DataMover modules and their functionalities undergo changes.

Figure 3:
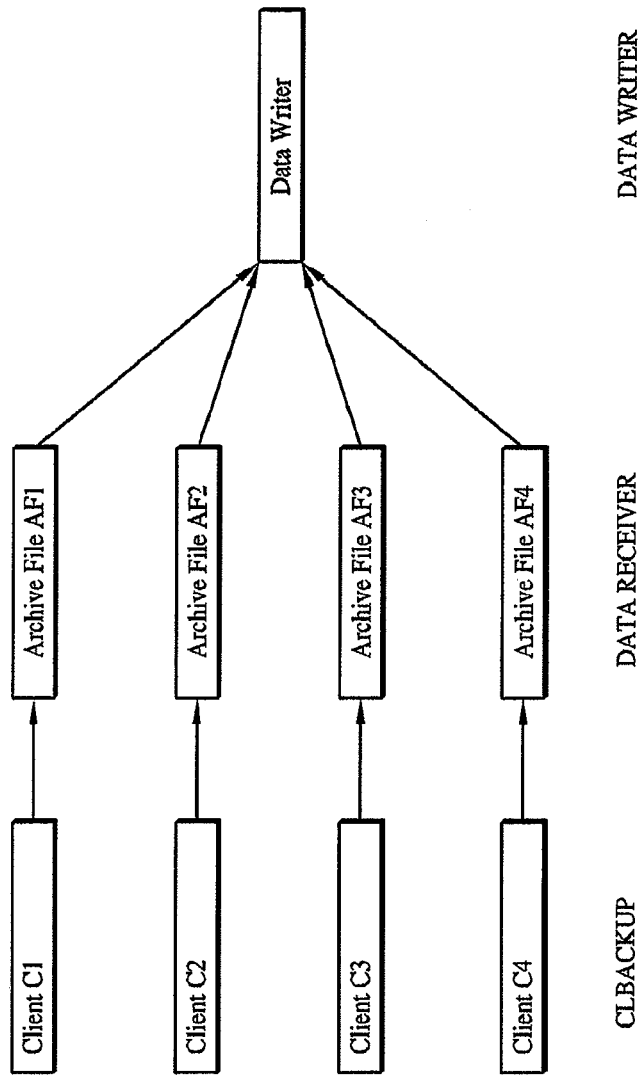
FIG. 3 presents a flow diagram of a system for multiplexing pipelined data according to an embodiment of the invention.

Referring now to FIG. 3, consider clients C1, C2, C3 and C4 are backing up at the same time and their data are getting multiplexed. DsBackup instantiates an object of Data Receiver and initializes the object. Media is mounted as a part of the initialization. One Data Writer object is instantiated for every media group Id. Considering that all four clients share the same media group id; only one Data Writer object is instantiated and all the four Data Receiver objects share the same object to write to the media.

Each Data Receiver writes a tag portion immediately by calling the Data Writer's Write ( ) method. Data Writer has an internal buffer, which is the same as the selected block size. When this buffer is full, the buffer is locked and emptied to the media. While this write operation is ongoing to the media, the second buffer will be ready to accept data from the Data Receiver. The thread, which calls the write on Data Writer, will return from the function call when the Media IO is complete. Meanwhile, the second buffer fills. These double buffers are guarded with appropriate semaphores to ensure proper concurrent access.

The Write operation is a blocking call and returns after completing the write. The Data Writer Write API takes in the archive file id as the parameter and once the write is completed, the physical offsets are updated in a list maintained by the Data Writer object accordingly. When the size of the chunk exceeds the pre-determined size, the chunk is automatically closed by writing a file mark, updating the archive manager tables in the storage manager or at the media agent, and also updating the physical offsets in the list or index maintained by the data writer object to track multiplexed storage files. The Data Writer object is responsible for handling the end of media condition and the Data Receiver does not generally require any knowledge about it.

As previously discussed, only the data writer object generally knows the chunk closure, but there are conditions where the close chunk operation could be needed because of a CLOSE ARCHIVE FILE message sent by the client. This means that the system may need to close the chunk though the size of the chunk may not have reached the predetermined size. When a CLOSE ARCHIVE FILE message is received from the client, DsBackup calls into Data Receiver Close that in turn calls the Data Writer Close. This close waits for a pre-determined amount of time for the chunk to get close on its own as the other clients may be still pumping in data to the chunk. If after the pre-determined time the chunk is not closed, the chunk is closed forcefully by writing a file mark and updating the appropriate index cache. The only side effect this could result in is that the chunk may not be as big as the pre-determined size as the close chunk has been force fully done. The pre-determined time for wait can be made configurable or can be made a variable parameter depending on the client type. With this new model there can be a situation that the tag header gets split and is spanned between two data buffers on the tape. This is generally addressed during the restore of data.

The following cases illustrate exemplary backup scenarios and considerations according to embodiments of the invention:

1. Initialization of DataWriter. During the Initialization, the active media for the media group is mounted. This method returns success only if the media is mounted correctly. If the media is already mounted, this method just returns success along with the volume Id of the mounted media. This may be required for logging information for the Data Receiver in some embodiments.

2. CreateArchiveFile: In this method, an Archive file header is written on to the media. This uses the special tag header which identifies the data in the tag portion as an archive file header.

3. WriteToMedia: This method returns information to the upper layer if the write is successful or not. Method returns information such as, end of the chunk, various media errors, Media is full etc. There is no other way to indicate these conditions other than as a return value in this method.

4. CloseArchiveFile: This method closes the archive file by writing an Archive file trailer to the media. This again has a specialized tag header which identifies the data as Archive file trailer. Close Archive file trailer does not return immediately. There is a configurable time interval for which the writing to the current chunk continues. The current chunk will be closed when all the archive files in this chunk gets over or after the above time out interval from the first archive file close request which comes in, whichever is the earliest.

There is generally no need of any call back methods to Data Receiver from Data Writer. All communication from Data Writer to Receiver should be through return values of the functions called in.

Restores of the multiplexed data are often less complicated since restores are generally not multiplexed as the back-ups. But the aim during the restores is to seek to the offsets and restore without looking into the tag headers in all of the data. Data Reader object is instantiated during restore. The parameter for this object remains the same as the current DataMover object. The client opens the required archive file by specifying the archive file id. Then the client sends the seek offset. The Data Reader object queries the archive manager to determine the chunk number that needs to be opened and the volume that should be mounted to seek to the give offset. Once the media is mounted the media is positioned to the correct file marker so as to open the chunk. Once the chunk header is read and discarded, data is read block by block and the size of the block is the same as the one that was used during the write. Every time a block of data is read all tag headers are examined to determine whether it contains the data of the archive file that we are looking for. This is done by traversing the buffer read in and looking through the tag headers. If it contains any other archive file's data, that tag portion is discarded and the next header is read. If the tag portion contains the data of the archive file that is being searched, then a check is done to see if the tag portion contains the offset that is being searched. If it does not contain the offset, this tag portion is skipped but the physical offset calculations are incremented appropriately. Once the correct block that contains the offset is reached, the data buffer pointer is positioned properly and the success is returned to the caller.

Once the seek is successful, a data reader/retriever module in the pipeline, such as the FsRestoreHead module in the GALAXY system, requests a read with the read size equal to the size of the tag header. The process looks into the tag header to determine the size of the data that has to be read and requests a read with the size of the data. The restore happens in this fashion. The Data reader will have a buffer more than equal the size of one pipe line header as it may need to buffer the data during a read request. The Data Reader also takes care of the case of tag headers that may have spanned between two data blocks.

There is also metadata that is written on to the tape (or other media) during back up to trouble shoot problems and also enable disaster recover programs, such as CommVault's Drrestore program which retrieves data from backups. During backup every time a chunk is closed, a file marker is written. After this a data block is constructed containing information, e.g., the list of archive file id's whose data is contained in the recently closed chunk and their physical offsets and the size within this chunk. A file marker follows this data and does not generally make any kind of update to the database. In order to facilitate the disaster recovery tool functionality, we also indicate which of the archive file ids were closed in the current chunk.

Figure 4:
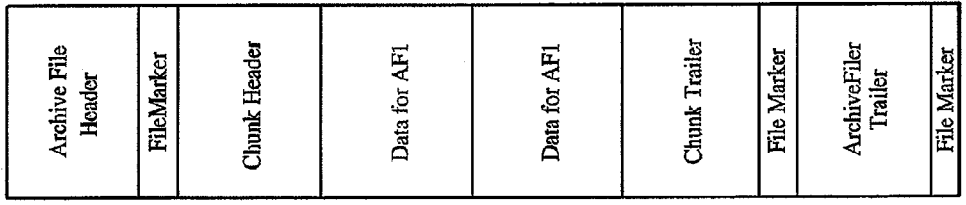
FIG. 4 presents an exemplary current data format used prior to multiplexing according to embodiments of the invention.

The data format on Media changes with Data Interleaving/Multiplexing. An exemplary current data format and related data structures used prior to multiplexing according to embodiments of the invention is shown in FIG. 4, and contains the following fields and properties:

```
ArchiveFile Header
{
    "ARCHIVE_FILE_HEADER_VERSION 2 .backslash.n "
    "HeaderSize"
    "FileId"
    "FileSeqNo"
    "StreamId"
    "ArchiveFileGroup "
    "AgroupId "
    "CopyId "
    "AppId"
    "JobId"
    "AppType "
    "BackupLevel"
    "BackupTime"
    "FileType"
    "SubAppType"
    "ClientName "
    "ArchiveFileName "
    "GALAXY Version "
    "ARCHIVE_FILE_HEADER_END 2"
}
ArchiveFile Trailer
{
    "ARCHIVE_FILE_TRAILER_VERSION 2 "
    "TrailerSize "
    "FileId "
    "FileSeqNo"
    "StreamId "
    "ArchiveFileGroup "
    "AgroupId "
    "CopyId "
    "AppId "
    "JobId "
    "AppType "
    "BackupLevel "
    "BackupTime "
    "FileType "
    "SubAppType "
```

-continued

```
    "ClientName "
    "ArchiveFileName "
    "GALAXYVersion "
    "PhysicalFileSize "
    "LogicalFileSize "
    "ARCHIVE_FILE_TRAILER_END 2 ",
}
ChunkHeader
{
    "CHUNK_HEADER_VERSION 2 "
    "HeaderSize"
    "FileId"
    "FileSeqNo"
    "ChunkSeqNo"
    "ChunkVol"
    "ChunkVolFM"
    "TagHeaderOffset"
    "CHUNK_HEADER_END 2"
}
ChunkTrailer
{
    "CHUNK_TRAILER_VERSION 1"
    "TrailerSize "
    "FileId"
    "FileSeqNo"
    "ChunkSeqNo"
    "ChunkVol"
    "ChunkVolFM "
    "ChunkLogicalSize "
    "ChunkPhysicalSize "
    "CHUNK_TRAILER_END"
}
```

Figure 5:
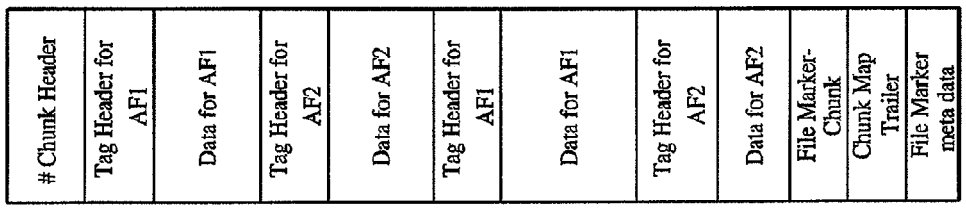
FIG. 5 presents an exemplary media format to support data multiplexing according to embodiments of the invention.

An exemplary media format to support data multiplexing according to embodiments of the invention is shown in FIG. 5:

When data multiplexing is enabled, other elements of the previous system also change in some embodiments as further described below. For example, Auxiliary Copy currently copies data chunk by chunk within an Archive File. The assumption is that the data within a chunk belongs to the same archive file. This is no longer true with data multiplexing. In embodiments where data multiplexing is supported, Auxiliary Copy allows two forms of copy mechanism: Simple Copy (copy whole chunk for all or part of archive files) and De-Multiplexed copy (archive file by archive file; only if source is magnetic).

In a simple copy, Auxiliary Copy creates a list of archive files that needs to be copied and copies then chunk by chunk and volume by volume. Data from different archive files will be copied at the same time to the secondary copy. This is faster, but the resultant copy will have the data still interleaved as the original copy.

In a de-multiplexed copy, Auxiliary Copy will copy data archive file by archive file. The result being that the system may go over the same set of media for each archive file discarding data encountered from a different archive file. This approach is slow and inefficient but the secondary copy has contiguous data for each archive file.

The system uses flags and other signaling mechanisms, for example flag deMultiplexDataOnCopy on the ArchGroupCopy object, to dictate the choice of copy mechanism. Archive Manager will pass down a list of Archive Files to be copied to the secondary copy, if the copy is setup for a Simple Copy. If the DeMultiplexing is supported on the Copy, AuxCopyMgr will pass down a single archive file to be copied.

Auxiliary Copy first creates all the headers for all archive files being copied and then starts the copy. A set of messages will be sent over the pipeline for creating these headers and in turn DSBackup will call DmReceiver create which will add archive file information to the dmreceiverinfo structure maintained in DmWriter. In some embodiments, Auxiliary Copy also supports client based copies, where archive files belonging for a set of clients will be copied. In other embodiments, a synthetic full backup combines archive files backed up from a single sub client and creates a full backup of all the incremental changes since the last full backup. The new archive file being created as part of Synthetic full can be multiplexed with other backups.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDAs), and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

Appendix A

Appendix A describes data structures, software modules, and other elements of the system according to embodiments of the invention, such as in the CommVault GALAXY system.

```
ArchChunkTable
table arch Chunk
(
    id              bigint, // 64 bit integer for unique chunk
                    identification
    commCellId      integer,
    volumeId        integer,
    fileMarkerNo    integer,
    createTime      integer,
    chunkVersion    integer,
    // INDEXES:
    primary key (archChunkId),
    foreign key (commCellId) references commCell(id),
    foreign key (volumeId) references MMS2Volume(VolumeId),
);;
ArchChunkMapping table
Table archChunkMapping
(
    archChunkId     bigint,
    archFileId      integer,
    commCellId      integer,
    archCopyId      integer,
    chunkerNumber           integer,
    physicalOffset          bigint,
```

-continued

```
    logicalOffset           bigint,
    physicalSize            bigint,
    logicalSize             bigint,
    primary key (archChunkId, archFileId, commCellId)
    foreign key (archChunkId, commCellId) references archChunk (id,
    commCellId),  foreign key (archFileId,  commCellId, archCopyId)
    references archFileCopy(archFileId, commCellId, copy),
);
create table archGroupCopy
(
    id              serial,
    archGroupId     integer,
    commCellId      integer,
    copy            integer,
    name            varchar(MAX_DEFAULT_REC_SIZE,
                    MIN_DEFAULT_REC_SIZE),
    compressionType integer,
    flags           integer,
    maxMultiplex    integer,
    isActive        integer,
    type            integer,
    startTime       integer,
    waitForIfOffline        integer,
    waitForIfBusy           integer,
    primary key (id,commCellId),
    foreign key (archGroupId) references archGroup(id),
    foreign key (commCellId) references commCell(id)
);;
```

Every Chunk has a Unique 64 bit id used as a counter to track chunks and perform other functions Multiple archive file may be part of a single chunk The ArchChunkMapping table determines archive files contained in each chunk DmReceiver during restores queries archive manager and get the information for the chunk required by providing the archive file id and the physical offsets.

All data contained in a chunk belongs to the same copy.

An integer value in the ArchGroupCopy table defines the multiplexing factor, and determines how many clients can backup to this copy at the same time. This factor is applicable for all streams within the copy.

deMultiplexDataOnCopy flag indicates whether Auxiliary Copy should de-multiplex data when creating a secondary copy. The flag on the secondary copy is what is taken into consideration.

1.1.1 Creation of a Chunk

DmWriter maintains a list of archive files that were written as part of the chunk When the chunk is closed, DmWriter makes a AMDS calls to close a chunk and will pass along a list of archive files that made up the chunk Archive Manager creates the necessary entries in the ArchChunkMapping table and the archChunk table entries 1.1.2 API's that Changes in Archive Manager and AMDS (1) ArchiveManagerDS::getAfileInfo (GetAfileInfoArgs_t*args, GetAfileInfoRet_t*ret)

Following structures defined in source/include/ArMgr/AmdsArgs.h and CVABasic.h change:

```
typedef struct {
    unsigned long afileNumber;
    unsigned long storagePolicyNumber;
    unsigned long commCellId;
    int needArchChunkId;
} GetAfileInfoArgs_t;
typedef struct {
    unsigned long afileNumber;
    unsigned long agroupNumber;
```

```
            unsigned long commCellId;
            string name;
            string objName1;
            string objName2;
            unsigned long objVersion;
            unsigned long numAppId;
            unsigned long fileType;
            unsigned long backupTime;
            unsigned long seq;
            unsigned long flags;
            longlong_t createJobId;
            unsigned long objType;
            unsigned long backupLevel;
            unsigned long isValid;
            unsigned long streamNum;
            ULONGLONG firstChunkId;
        } GetAfileInfoRet_t;
```

(2) int ArchiveManagerDS::closeChunk (CloseChunkArgsDS_t*args, CloseChunkRetDS_t*ret)

Following structures defined in source/include/ArMgr/ AmdsArgs.h and CVABasic.h change:

```
        struct CloseChunkArgsDS_t {
            unsigned long commCellId;
            unsigned long archCopyId;
            ULONGLONG archChunkId;
            int needNextArchChunkId;
            unsigned long volumeId;
            unsigned long fileMarkerNo;
            unsigned long numberOfAfiles;
            ChunkArchFileMsg_t *afileArray;
            CloseChunkArgsDS_t( ) : needNextArchChunkId(0) { }
        };
        typedef struct {
            ULONGLONG newChunkId;
        } CloseChunkRetDS_t;
        struct ChunkArchFileMsg_t {
            unsigned long archFileId;
            unsigned long chunkNumber;
            u_longlong_t physicalOffset;
            u_longlong_t logicalOffset;
            u_longlong_t physicalSize;
            u_longlong_t logicalSize;
        };
        typedef struct ArchiveFileId_t
        {
            unsigned long commCellId;
            unsigned long agroupNumber;
            unsigned long afileNumber;
        } ArchiveFileId_t;
```

1.2 Resource Manager

In previous versions of the system which did not support multiplexing, a single Volume (defined by MMS2 Volume table) could be reserved only once—the same held true for drive reservations. This behavior changes to support data multiplexing. A given volume can be reserved multiple times by different jobs for writes. The number of times a volume can be reserved for writes is determined by the an index value, such as the howManyCanMultiplex value set in the ArchGroupCopy table. The same stream also now can be reserved multiple times due to this change.

```
    table archStream
    (
        commCellId          integer,
        archGroupId         integer,
        archGroupCopyId     integer,
        stream              integer,
        mediaGroupId                integer,
        isActive            integer,
        PreEmptable         integer,
        lastAfileIdCopied   integer,
        howManyReservations         integer,    // Currently how
                                                // many reservations
        primary key (stream, commCellId, archGroupId,
            archGroupCopyId),
        foreign key (commCellId) references commCell(id),
        foreign key (archGroupId) references archGroup(id)
        foreign key (mediaGroupId) references
            MMS2MediaGroup(MediaGroupId)
    );;
    table archStreamReserve
    (
        jobId               LONGLONG,
        priority            integer,
        reserveTime         TIME_T,
        interruptJobId      LONGLONG,
    );
```

Resource Manager allows up to "howManyCanMultiplex" number of reservations on a volume, stream and drive when reservation type is "WRITE"

Jobs running as part of a copy that support Multiplexing cannot generally be interrupted These jobs can be suspended or killed The Mark media full option is supported once per media group.

Streams availability is no longer based on the "inuse" flag but on "howManyReservations" field. If this value equals the "howManyCanMultiplex" value for the ArchGroupCopy then that stream cannot generally be reserved.

Resource Manager will reserve a specific drive.

The selection of the drive is based on the volumeid and the mediaid set on the drive table. If the requested media is already cache mounted in the drive and then that drive is reserved.

Resource Manager disallows any reservation of a client that wants to participate in data multiplexing if the client has not been upgraded to support multiplexing.

1.3 Media Manager

In previous versions of the system that did not support multiplexing, Media Manager mounted a particular volume into any available drive and set the drive id in the reservation tables. This will change as now the reservation will be made for a specific drive. When the mount request is received, Media Manager determines that the drive that is reserved for this job and mounts the media into that drive. If the media is cache mounted in a different drive then the reservation will be switched to that drive if that drive is not reserved.

1.4 DSBackup

With data multiplexing data of different clients will belong to the same chunk and hence each data block in the chunk has to be identified uniquely so as to perform the restore. This will be achieved by storing the archive file id into the tag header that is associated with every data block. The arch file id will uniquely identify the data block and the database can be used to determine the client to which the data belongs. The structure of an exemplary tag_header is given below.

```
typedef struct
{
    char tag_magic[8];          // version of the tag. => Always
                                use
                                // FILLTAGMAGIC to fill the
```

```
                                tag_magic
ULONGLONG block_offset;         // to be filled by client.
                                // offset within archive
ULONGLONG block_number;         // filled by client - block no
                                // within afid
ULONGLONG functional_header_number;  // sequence no of
fun.header unsigned long buf_type;   // type of the buffer -
                                // MSB bit indicates data/functional
                                // header / PL_NAS_CMDS etc.
                                // 0-data 1-functional header
unsigned long actual_block_size;     // size of the data
                                associated with
                                // this header
unsigned long compressed_block_size; // compressed size of the
data
                                // associated with this header
unsigned long validity_bits;    // flags
unsigned long buffer_validity;  // invalid buffer
unsigned long data_offset;      // offset of data within the block
unsigned long next_header_offset;    // offset of next header. 0
means none
unsigned long compression_scheme;    // scheme of compression to
be applied
                                // 0 gzip
                                // 111 (binary) no compression
unsigned char scatter_gather;   // wont be used in vldb 98
                                // There are 3 extra bytes here for
alignment
unsigned long compressed_data;  // data is compressed y/n
? This filed is
                                // nolonger reliable because of a
difference on UNIX
unsigned char restore_backup;   // data stream of
backup==0,restore==1
unsigned char signature_dependency;  // 0 not dependent on
signature
                                // 1 dependent on
signature
char spare[16];
}tag_header_t;
```

The field validity_bits has been renamed to archive_file_id to store the archive file as shown below.

```
typedef struct
{
    char tag_magic[8];          // version of the tag. => Always use
                                // FILLTAGMAGIC to fill the
    tag_magic
    ULONGLONG block_offset;     // to be filled by client.
                                // offset within archive
    ULONGLONG block_number;     // filled by client - block no
                                // within afid
    ULONGLONG functional_header_number;  // sequence no of
    fun.header
    unsigned long buf_type;     // type of the buffer -
                                // MSB bit indicates data/functional
                                // header / PL_NAS_CMDS etc.
                                // 0-data 1-functional header
    unsigned long actual_block_size;     // size of the data
    associated with
                                // this header
    unsigned long compressed_block_size; // compressed size of the
    data
                                // associated with this header
    unsigned long archive_file_id;
    unsigned long buffer_validity;  // invalid buffer
    unsigned long data_offset;  // offset of data within the block
    unsigned long next_header_offset;    // offset of next header. 0
    means none
    unsigned long compression_scheme;    // scheme of compression to
    be applied
                                // 0 gzip
                                // 111 (binary) no compression
    unsigned char scatter_gather;   // wont be used in vldb 98
                                // There are 3 extra bytes here for
    alignment
    unsigned long compressed_data;  // data is compressed y/n
    ? This filed is
                                // nolonger reliable because of a
    difference on UNIX
    unsigned char restore_backup;   // data stream of
    backup==0,restore==1
    unsigned char signature_dependency;  // 0 not dependent on
    signature
                                // 1 dependent on signature
    char spare[16];
}tag_header_t;
```

The archive file id is filled by the pipe layer of the client during backup. The tag header is written on to the media in the same format without any modification. During restore Data Reader reads the tag header to get find the archive file and in turn determine whether the data associated with that restore is required for the current restore or not.

1.5 DataMover (Windows Implementation)

Datamover is responsible of writing the data transferred over the pipeline to the media. With data multiplexing Datamover gets split into two components, Data Receiver (DmReceiver) and Data Writer (DmWriter). DsBackup invokes an instance of DmReceiver object. The DmReceiver object internally checks for the DmWriter's existence for the requested MediaGroupId. If the DmWriter is not present then a new instance of the DmWriter is created and cached in a DmWriter map. This map is maintained in CVD's context of the media gent and is accessible to all DmReceiver. DmWriter maintains an internal buffer corresponding to the volume block of the data per DmReceiver. The volume block size is determined from the media type being used. Write on the DmReceiver will call DmWriter write. DmWriter will copy the pipeline buffers internally for aligning it to the volume block in the Receiverinfo structure.

DataMoverBase class is the class that implements the functionality of DataWriter. Since this class will be used for both backup and restore it was given a generic name "DataMoverBase"

In the above classes, Data Receiver is a thin layer which in many cases calls the DataWriter methods directly.

What is claimed is:

1. A data storage system comprising:
a data multiplexing storage policy that defines the backup and multiplexing of data associated with multiple clients, wherein at least a first data stream associated with a first client and a second data stream associated with a second client are multiplexed onto the same storage media;
a storage manager that stores the data multiplexing storage policy in association therewith, the storage manager executing in one or more computer processors, wherein the storage manager controls backup storage operations associated with backup of data from one or more clients to at least a first storage device;
the storage manager configured to, based on the data multiplexing storage policy, backup data on the first client by directing the first data stream of data from a first client to a first storage media;
the storage manager further configured to, based on the data multiplexing storage policy, backup data on the second client by directing the second data stream of data from the second client to the first storage media; and
a receiver executing in one or more computer processors that receives the first and second data streams, wherein the receiver is configured to, based on the data multiplexing storage policy, multiplex at least portions of the first and second data streams to create a data chunk, wherein the multiplexer is further configured to add one or more identifiers to the data chunk that identifies in the data chunk, the portions of the first and second data streams in the data chunk and storing the data chunk on the first storage media.

2. The system of claim 1, wherein at least one of the one or more identifiers is a tag header that comprises the size of data written in the first data chunk from a corresponding data stream.

3. The system of claim 1, wherein the first data stream is obtained from a first archive file and the second data stream is obtained from a second archive file.

4. The system of claim 1, wherein the receiver multiplexes the first and second data streams by writing data from the first and second data streams into more than one data chunk.

5. The system of claim 1 wherein the storage manager directs the reservation of a volume on the first storage device based on the data multiplexing storage policy.

6. The system of claim 1, wherein the first data stream and the second data stream are directed simultaneously to the receiver.

7. The system of claim 1, wherein the number of data streams are associated with the number of drives in a drive pool.

8. A data storage system comprising:

storing a data multiplexing storage policy in association with a storage manager, wherein the data multiplexing storage policy defines the backup and multiplexing of data associated with multiple clients, wherein at least a first data stream associated with a first client and a second data stream associated with a second client are multiplexed onto the same storage media;

backing up data on the first client based on the data multiplexing storage policy, by directing the first data stream of data from the first client to a first storage media;

backing up data on the second client based on the data multiplexing storage policy, by directing the second data stream of data from the second client to the first storage media;

multiplexing with one or more computer processors, based on the data multiplexing policy, at least portions of the first and second data streams to create a data chunk; and adding one or more identifiers to the data chunk that identifies in the data chunk, the portions of the first and second data streams in the data chunk; and storing the data chunk on the first storage media.

9. The method of claim 1, wherein at least one of the one or more identifiers is a tag header that comprises the size of data written in the first data chunk from a corresponding data stream.

10. The method of claim 1, wherein the first data stream is obtained from a first archive file and the second data stream is obtained from a second archive file.

11. The method of claim 1, wherein the multiplexing further comprises writing data from the first and second data streams into more than one data chunk.

12. The method of claim 1 further comprising reserving a volume on the first storage device based on the data multiplexing storage policy.

13. The system of claim 1, wherein the first data stream and the second data stream are directed simultaneously to the receiver.

14. The system of claim 1, wherein the number of data streams are associated with the number of drives in a drive pool.

* * * * *